(12) United States Patent
Wang et al.

(10) Patent No.: US 10,528,152 B1
(45) Date of Patent: Jan. 7, 2020

(54) MIXED INPUT LIGHTING USING MULTIPLE LIGHT SOURCES WITH SWITCHABLE OPERATIONAL STATE

(71) Applicant: Apple Inc., Cupertino, CA (US)

(72) Inventors: Paul X. Wang, Cupertino, CA (US); Liquan Tan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 15/708,021

(22) Filed: Sep. 18, 2017

Related U.S. Application Data

(60) Provisional application No. 62/397,032, filed on Sep. 20, 2016.

(51) Int. Cl.
*G02F 1/133* (2006.01)
*G06F 3/02* (2006.01)
*G01J 1/42* (2006.01)
*G06F 15/02* (2006.01)

(52) U.S. Cl.
CPC .......... *G06F 3/0202* (2013.01); *G01J 1/4204* (2013.01); *G06F 15/0216* (2013.01)

(58) Field of Classification Search
CPC .......... G06F 3/017; G06F 3/011; G06F 13/00; G06F 2203/0338; G06F 3/03547; G06F 3/04815; G06F 1/1643; G06F 3/0488; G06F 2203/0339; G02F 1/13338; G02F 1/133603

USPC ............... 250/214 AL, 214 R, 205
See application file for complete search history.

(56) References Cited

U.S. PATENT DOCUMENTS

| | | | |
|---|---|---|---|
| 4,934,852 A | 6/1990 | Havel | |
| 7,358,929 B2 | 4/2008 | Mueller et al. | |
| 7,642,730 B2 | 1/2010 | Dowling et al. | |
| 7,766,517 B2 | 8/2010 | Kerr et al. | |
| 7,939,794 B2* | 5/2011 | Rains, Jr. ................. | F21S 2/00 250/228 |
| 9,275,810 B2 | 3/2016 | Pance et al. | |
| 2004/0201573 A1 | 10/2004 | Yu et al. | |
| 2008/0001787 A1 | 1/2008 | Smith et al. | |
| 2010/0300856 A1 | 12/2010 | Pance et al. | |
| 2013/0128103 A1 | 5/2013 | Spielberg | |

* cited by examiner

*Primary Examiner* — Que Tan Le

(57) ABSTRACT

Disclosed are structures, devices, methods and systems for providing dynamically variable internal illumination to individual input devices of an electronic device, such as keys of a keyboard. In some embodiments, input devices contain multiple LEDs whose light intensity may be varied to alter a tone or a color of light used for the internal illumination a key. The LEDs may be micro LEDs and may be internal components of the input device as a unit. In some embodiments, the LEDs are white light LEDs having different phosphor thicknesses. In some embodiments the LEDs may be RGB LEDs, with individual control of color contributions to modify the internal illumination. Systems incorporating such input devices may need only a reduced set of LED control units. Systems can include a processing unit and a light sensor or camera to detect ambient lighting and adjust internal illumination of an input device accordingly.

14 Claims, 13 Drawing Sheets

MIXED INPUT LIGHTING USING MULTIPLE LIGHT SOURCES WITH SWITCHABLE OPERATIONAL STATE

CROSS-REFERENCE TO RELATED APPLICATION

This application is a nonprovisional patent application of and claims the benefit under 35 U.S.C. § 119(e) of U.S. Provisional Patent Application No. 62/397,032, filed Sep. 20, 2016 and titled "Input Backlight Using Micro LEDs," the disclosure of which is hereby incorporated by reference herein in its entirety.

FIELD

The present disclosure generally relates to providing internal illumination of input devices of electronic devices. Such electronic devices include desktop computers, tablet computers, instrument displays, cell phones, personal digital assistants, and the like. The input devices include keys of a keyboard, buttons, and touchpad surfaces. More specifically, the present disclosure is directed to electronic devices having input devices with individually and dynamically variable internal illumination.

BACKGROUND

Electronic devices, such as desktop or tablet computers, instrument displays, and cell phones, often are connected with keyboards, buttons or other input devices with which a user interacts with the device. These input devices may be located in a specific input area on the electronic device or on a peripheral device communicatively linked with the electronic device. An example of the former is a keypad shown on a display of a cell phone, while an example of the latter is a keyboard connected to a desktop computer, or the keyboard of a laptop computer.

Keys of keyboard, buttons or other input devices may have internal lighting to provide either feedback to a user or for improved user experience. While some conventional keyboards may include internal illumination for keys, such conventional keyboards typically do not offer the ability to dynamically control lighting schemes, such as color or tone, for each of the keys individually. To provide improved user experience and increase potential for feedback to a user, it would be helpful to have keys of keyboards, or other input devices, with individually controllable variable internal illumination.

SUMMARY

This Summary is provided to introduce a selection of concepts in a simplified form that are further described below in the Detailed Description section. This summary is not intended to identify salient features or essential features of the claimed subject matter, nor is it intended to be used as an aid in determining the scope of the claimed subject matter.

One embodiment described herein takes the form of an input device for an electronic device, the input device comprising: a contact surface having a light transmissive area; a first light emitting diode (LED) that emits a first light having a first white light spectrum; and a second LED that emits a second light having a second white light spectrum that is different from the first white light spectrum; wherein: the first and the second LEDs are positioned beneath the contact surface; the first light and the second light combine to form a combined light having a combined white light spectrum; the combined light is visible through the light transmissive area of the contact surface; and at least one of the first LED or the second LED is operable to switch from a first operational state to a second operational state in response to a signal received from the electronic device during operation of the electronic device.

Another embodiment described herein takes the form of an electronic device, comprising: a sensor configured to detect a property of an ambient light exterior to the electronic device; an input device comprising: a contact surface comprising: an opaque region; and a non-opaque section through which light can pass, the non-opaque section adjacent the opaque region; a base surface opposite the contact surface; a set of micro light emitting diodes (µLEDs), comprising: a first µLED that emits a red light; a second µLED that emits a blue light; and a third µLED that emits a green light; and a controller configured to receive a signal sent from the electronic device; wherein: the red, blue, and green light combine to form a transmitted light having a net color, the transmitted light visible through the non-opaque section of the contact surface; and the controller is operative to cause at least one of the set of µLEDs to vary intensity of its emitted light, thereby changing the net color.

Still another embodiment takes the form of a method for illuminating a contact surface of an input device, comprising: measuring, by a light sensor, a property of a light in an environment of the electronic device; receiving, at a processing unit, data from the light sensor related to the detected property of the light in the environment of the electronic device; selecting, by the processing unit, a first µLED operative to emit first white light over a range of intensities; determining, by the processing unit, an intensity of the first white light for the first µLED; transmitting data related to the determined intensity from the processing unit to a LED controller unit; sending a signal from an LED controller unit to an input of the µLED, the signal causing the µLED to emit the first white light at the determined intensity; combining the first white light from the first µLED with second white light from a second µLED, thereby generating a combined light having a spectral curve different from spectral curves of the first and second µLEDs; and transmitting the combined light through the contact surface.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
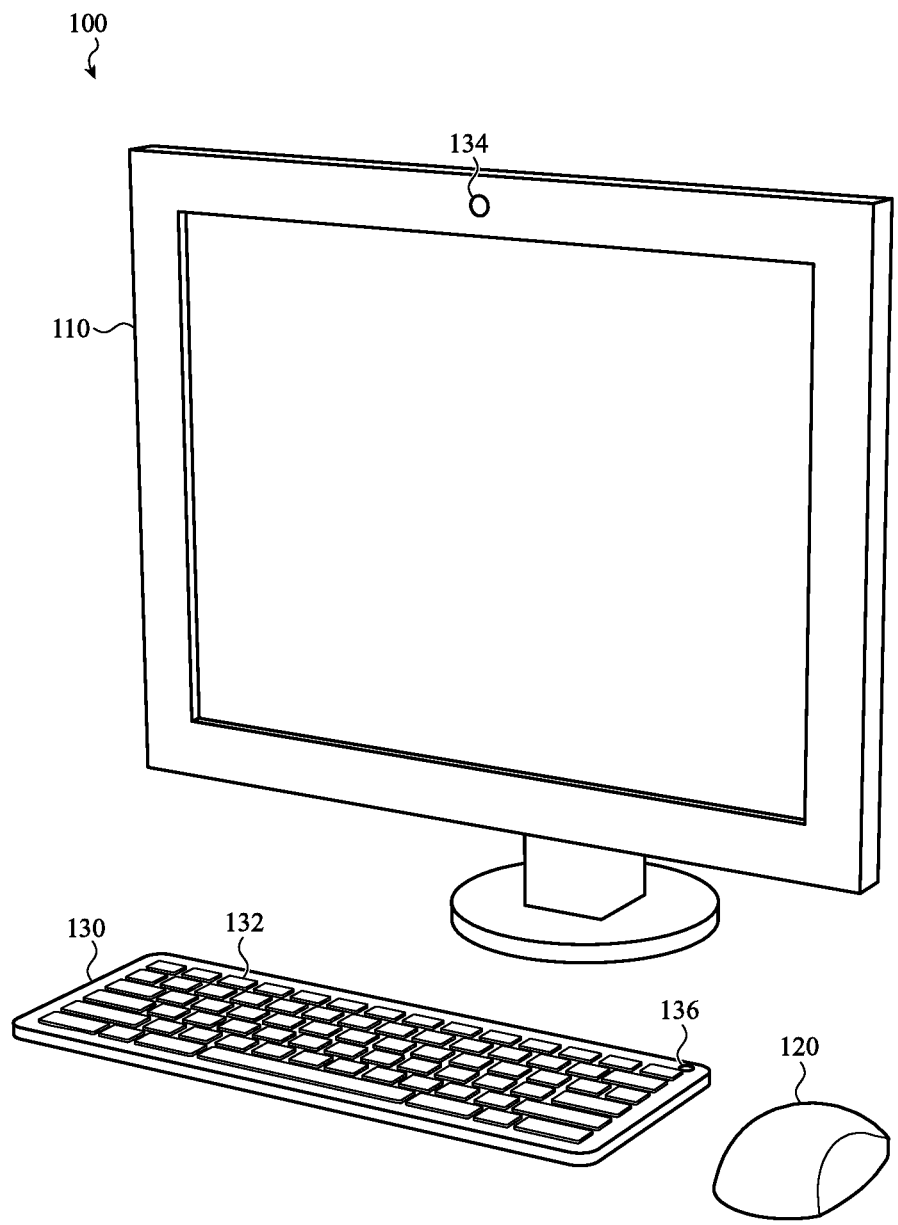
FIG. 1A illustrates a desktop computer system that may incorporate an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

This application is directed to devices, systems and methods that implement variable internal illumination of input devices of electronic equipment. Input devices include keys of computer keyboards, contact areas on a contact pad, buttons on instrument control panels, buttons on a computer mouse, and the like. Rather than having a fixed tone (such as a perceived "warmth" or "coolness", and/or a particular color component such as a hue) or color for the light emitted by the internal illumination, user experience can be improved by using variable internal illumination, i.e., internal illumination that can be varied dynamically during operation of the electronic device. For example, the tone of the light emitted by one or more input devices may be varied to match more closely a tone of an ambient light in the electronic device's environment. In some embodiments, such dynamic variation can be implemented through use of a light sensor coupled to a processor and a light source controller that alters the internal illumination. Alternatively, the internal illumination may be varied away from a default tone to convey information, such as alerts, to the user.

Variable internal illumination of keys may provide improved user experience and information output. The light sources for the variable illumination of the keys, or other input devices, can be provided from within the keys by light emitting diodes (LEDs). It is especially advantageous if the internal illumination is provided by micro LEDs (μLEDs).

More specifically, described herein are electronic devices that have at least one key in which the key has corresponding components to provide dynamically variable internal illumination. The internal illumination is seen by a user after it emerges through a light transmissive area of an input surface of the input device that allows light to pass through, if only partially. The term "contact surface" will also be used, as discussed below, for an input surface through which light can pass. In some embodiments, the internal illumination may be provided by multiple LEDs. Some of these embodiments use one or more white light emitting LEDs, i.e., LEDs emitting light with a white light spectrum as detailed below. The white light emitting LEDs used for a key may have different phosphor thicknesses to provide either a warmer or a cooler appearing light. By varying the intensity of light emitted from each LED individually, a net color spectrum of internal illumination for the key may be changed dynamically.

In additional and/or alternative embodiments, the internal illumination may be implemented by use of one or more sets of red, green and blue (RGB) LEDs. Varying the intensity of light emitted from each of the individual RGB LEDs may produce a change to the tone or color of the internal illumination for the key.

Also described are embodiments for a key having variable internal illumination provided by LEDs arranged in certain orientations and configurations. The LEDs within such a package may be μLEDs, as described below. An integrated package for the key may include one or more optical diffusers. Configurations of the μLEDs within the integrated package may enhance mixing of the LEDs' separately emitted lights so that a single net light emerges through the light transmissive area of an input surface. Example configurations include having the light emitted from the μLEDs be: (1) projected directly through a light diffusor to the light transmissive area of the input surface of the key; (2) projected within the package parallel to the key's input surface; and (3) projected directly away from the top surface of the key and be reflected internally off an internal reflective surface back through the light transmissive area of the input surface of the key.

Some embodiments disclose input devices that have a contact surface, i.e., an outer surface oriented to accept a user input, which the user touches (either directly or indirectly) to have the input device register an input. For some of the embodiments, such contact surfaces have a non-opaque section or area made of a light transmissive material, i.e., a material that allows some or all of the light originating from a source behind the contact surface to exit through the material and be visible to a user. Examples include transparent and translucent plastics, glass, transparent or translucent ceramics, and other transparent or translucent materials. Herein, such materials may also be referred to as "non-opaque." Opaque materials are those that allow no visible light to pass through.

Such embodiments use one or more light emitting diodes (LEDs) as the light source or sources behind the contact surface. Such LEDs may be white light LEDs emitting a white light spectrum, i.e. LEDs emitting light have significant power across a large portion of the visible spectrum. The visible spectrum will refer to light having wavelengths between 400 nanometers (nm) and 700 nm. Additionally and/or alternatively, various colored LEDs, such as a set of red, green and blue (RGB) LEDs, or combinations thereof. A colored LED emits light in a narrow wavelength band of the visible spectrum. As used herein, "LED" will refer to a complete electronic device, rather than solely the semiconductor material that can be made to emit light.

In some embodiments, as explained more fully below, dynamic variability in internal illumination tone is implemented by use of one or more pairs of white light LEDs in which the LEDs within a pair have different thicknesses of a phosphor coating. One phosphor coating thickness can make the tone of the white light spectrum of a white light LED be a 'warmer' tone (e.g., having a stronger yellow component), whereas a different thickness can make the tone of the white light spectrum "cooler" (e.g., having a stronger blue component). Varying the relative intensity of light emitted by each white light LED in such a pair can vary the tone of an input device's internal illumination. Various control methods, as explained below, can be used so that the intensity of each LED's emitted light varies over a continuous range of values to make the perceived tone also vary over a continuous range.

Additional and/or alternative embodiments may use one or more sets of colored LEDs. Colored LEDs each emit a light having a specific, narrow spectrum, as discussed below. An example of a set such colored LEDs is a set of three diodes with respectively red, green, and blue (RGB) colors. These colors can be combined, with varying intensities, to produce an internal illumination over a wide continuous range of user-perceived net colors. Differential phosphor coating thicknesses may also be used with the sets of colored LEDs.

In some embodiments the LEDs are micro LEDs (µLEDs) having a much-decreased size compared to a standard sized LED. A standard sized LED is typically contained in a package having dimensions on the order of tens of millimeters, whereas µLEDs typically have smaller semiconductor dies and/or packaging so as to have dimensions of 5 mm or less, although other µLEDs may be 10 mm or smaller, or thereabouts. One or more sets of such µLEDs may be mounted, such as on a printed circuit board, behind the contact surface.

In order to improve uniformity of the tone or net color of the internal illumination emerging from the contact surface, some embodiments may mount the µLEDs so that their emitted light is not projected directly towards the contact surface of the key, but internally into the housing of the input device in order to reflect and mix before emerging through the contact surface. In some embodiments, the µLEDs are mounted to project their emitted light towards a reflective surface. Various embodiments may make use of a light diffusor behind the contact surface to improve uniformity of the tone or net color of the internal illumination emerging from the key. As used herein, a combined light, a net color, or a net light refers to light having a single spectrum or appearance regardless of any solid angle from which it is viewed, so that light from the separate sources cannot be distinguished.

To dynamically vary the tone or net color of the internal illumination, the LEDs in the input devices may be controlled by external electrical LED controller units. The LED controller units may in turn be controlled by a processor or logic unit. The processor or logic unit may receive input data from a light sensor that measures properties of ambient light in the electronic device's environment. The processor or logic then calculates a tone or net color for the internal illumination to be emitted by the LEDs, and sends corresponding signals to the LED controller units to implement any needed change in an operational state of an LED. Operational states of an LED may be the intensity of the light emitted, a tone or hue of a light, a duty cycle, or whether the LED is 'on' or 'off.' By altering an operational state of an LED, the combined light emerging through the contact surface may change in tone or net color The processor or logic unit may use alternative or additional inputs, such as from programs running on the processor, to calculate a tone or net color for the internal illumination, and to cause the some or all of the LEDs to change operational states.

These general descriptions of embodiments will now be explained in further detail with respect to the accompanying figures. For conciseness, hereinafter the term "key" will denote any such input device; the specific case of a key of a keyboard will be referred to as a "key of a/the keyboard."

Figure 1B:
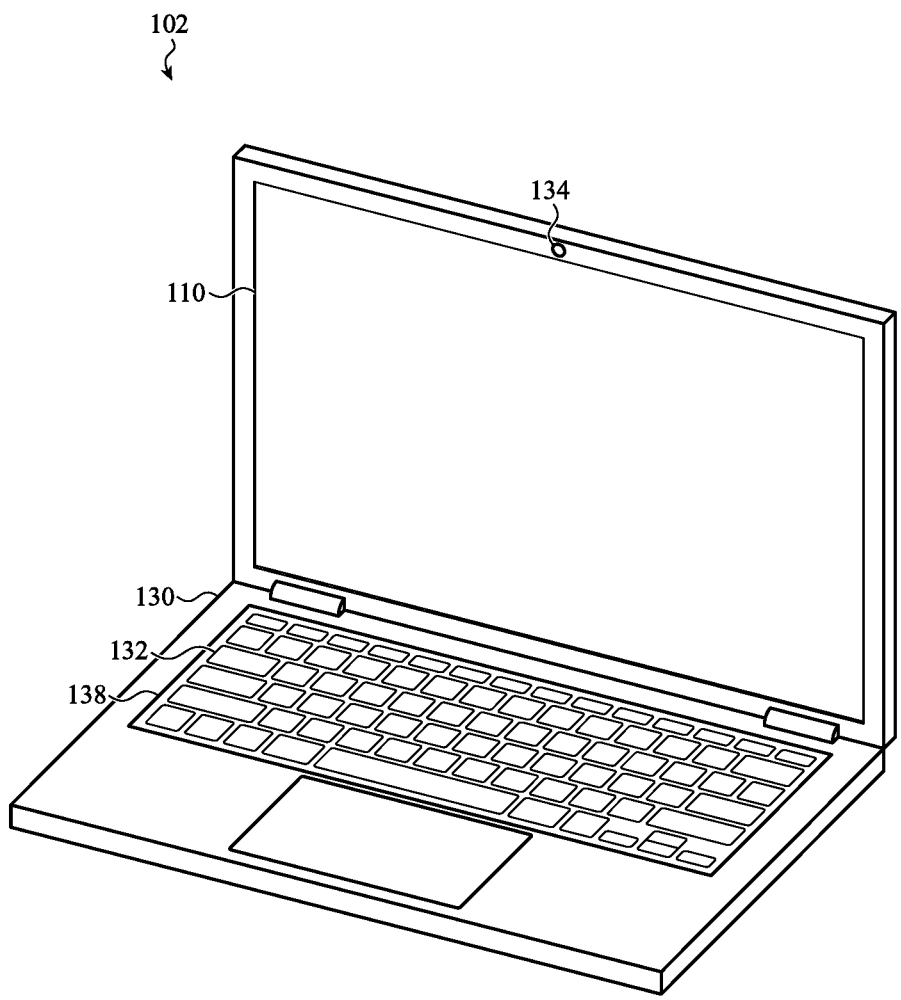
FIG. 1B illustrates a laptop computer that may incorporate an embodiment.
Figure 1C:
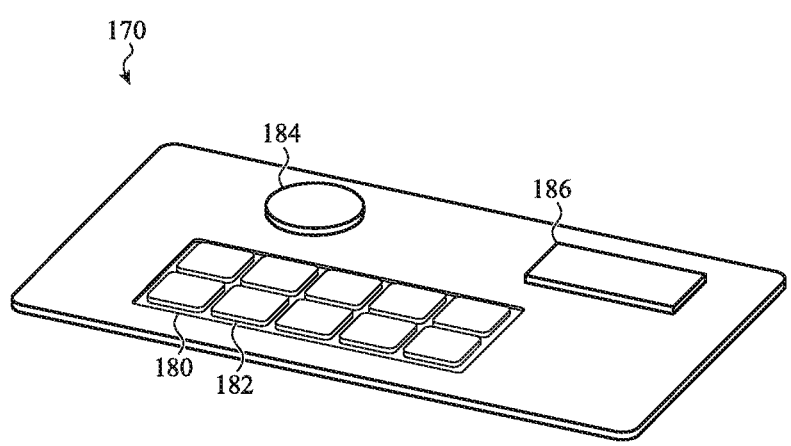
FIG. 1C illustrates an instrument panel that may incorporate an embodiment.

FIG. 1A-C show various example electrical devices having respective keys that may incorporate various embodiments disclosed herein. FIG. 1A illustrates a desktop computer system 100. Components of the desktop computer system 100 may include display monitor 110 with processing unit built in, a mouse 120 for user input and a keyboard 130 for user input. The desktop computer system 100 may incorporate a camera 134 for both visual recordation and ambient light sensing of a local environment of the desktop computer system 100. In other implementations, a processing unit, hard disk drive and other peripheral devices may be separate from the display monitor 110. Instead of, or in addition to, the camera 134, the desktop system may have a dedicated light sensor.

Examples of keyboard 130 include a traditional 101/104 key keyboard common in the United States and a 102/105 keyboard common in Europe. Various keys 132 of the keyboard 130 may be embodiments with internal illumination provided by LEDs, as described below. The keyboard 130 may include a light sensor, or camera, 134, which may be configured to sense the ambient lighting of a user's local environment. Though not shown, the keyboard 130 and the mouse 120 are communicatively linked with the combined processing unit and display monitor 110.

FIG. 1B illustrates a laptop computer 140 that may incorporate some of the embodiments disclosed herein. The laptop computer 140 has as an outer housing 142 that encloses memory units, such as RAM and a hard disk drive, a processing unit, network interfaces, I/O ports, and other components known in the art. The laptop computer 140 includes a folding monitor 144 for displaying output to a user. The monitor 144 may include a camera 134 for recording visual information, and may function as a light sensor for detecting a property (or properties) of the ambient lighting in a user's local environment. The laptop computer 140 includes a multiple keys 132 and 138 on the keyboard 130. Some or all of the keys 132 and 138 of the keyboard 130 may be embodiments with internal illumination provided by LEDs as described below.

FIG. 1C shows an example of an instrument panel 170, which may be incorporated in a laboratory measurement or factory control electronic device. Users make inputs to the electrical device through keys on the instrument panel 170. Instrument panel 170 includes two dedicated control keys 184 and 186 that may implement specific commands, such as automatic shutdown or toggle between measurement methods. The dedicated control keys 184 and 186 may make use of LEDs with internal illumination as described below.

Instrument panel 170 includes multiple keys 182 of the keyboard 180. Users may input a variety of instructions by entering corresponding commands through the keyboard 180. Some or all of the keys 182 of the keyboard 180 may be embodiments LEDs having internal illumination as described below.

FIGS. 2A-E illustrate components of certain embodiments of keys having LEDs that provide internal illumination.

Figure 2A:
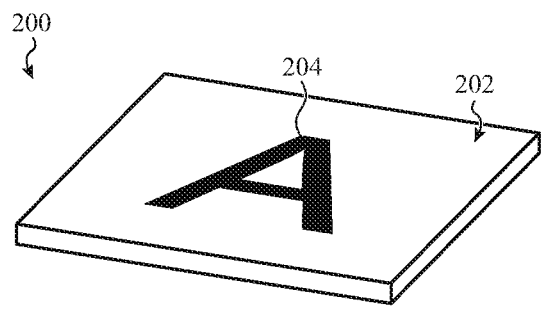
FIG. 2A illustrates a keycap having an opaque glyph, according to an embodiment.

FIG. 2A shows an embodiment of a contact surface 200 for a key that may be incorporated in one of the electrical devices illustrated in FIGS. 1A-C. In the embodiment shown in FIG. 2A, the contact surface 200 is a keycap of a key of a keyboard, the key incorporating LEDs for internal illumination. In this embodiment, the contact surface 200 has an opaque region defining a glyph (symbol) 204. The remaining area 202 of the contact surface 200 not covered by the glyph 204 is light transmissive; i.e., light originating from a source on one side can be observed on the other side. This non-opaque section may be transparent or translucent, depending on the embodiment.

Figure 2B:
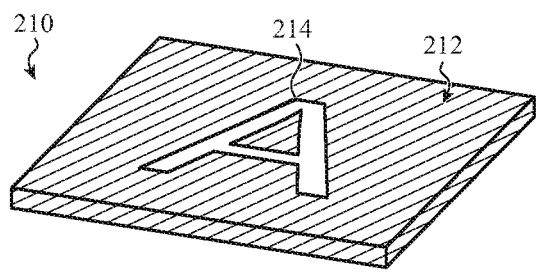
FIG. 2B illustrates a keycap having a transparent glyph, according to an embodiment.

FIG. 2B shows a second embodiment of a contact surface 210, in this case another keycap of a key of a keyboard, in which the glyph 214 is made of a light transmissive material, while the remaining area 212 of the contact surface 210 defines an opaque region.

Figure 2C:
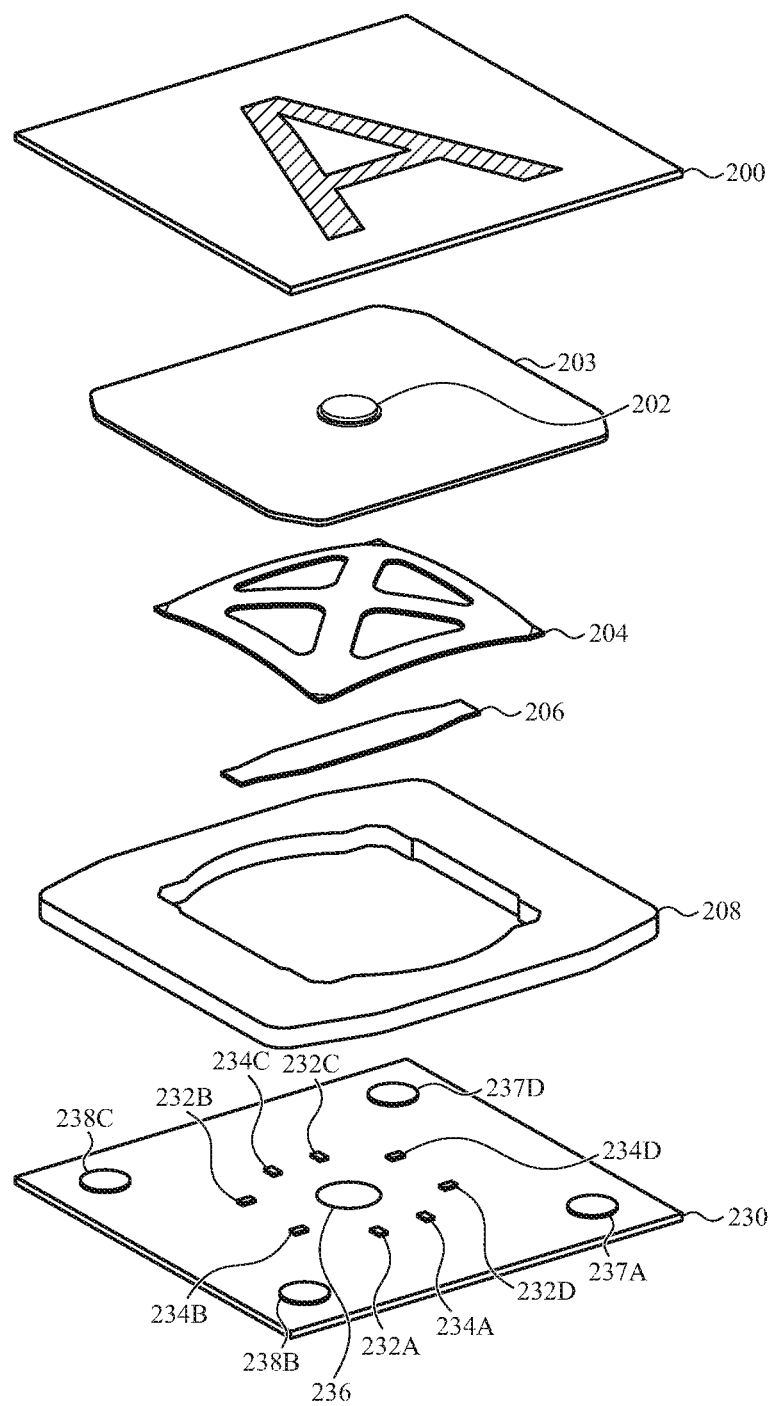
FIG. 2C shows an exploded view of components of a key using a dome switch, according to an embodiment.

FIG. 2C shows an exploded view of components of a sample key of a keyboard. The particular embodiment shown in FIG. 2C is for explanatory purposes, and is not to be considered limiting in regard to the scope of the claims. Other embodiments of keys of a keyboard may contain more or fewer components in alternate configurations.

One component is a contact surface 200, which can be the contact surface (keycap) of FIG. 2A. Next, the contact surface 200 may lie atop an optional film member 203, which includes a disk 202. The optional film member 203 and disk 202 contact the dome 204, which flexes under a user's touch of the contact surface 200 to indicate the user's selection of the key. Upon flexing, the dome 204 contacts the conductive bar 206 to make a circuit and send a signal that the key is depressed. The optional film member 203, dome 204 and conductive bar 206 nest inside a housing 208. These nested components rest on base surface 230. The base surface 230 can be a printed circuit board on which electrical lands are placed. For clarity, the lands on the base surface 230 are not shown, but will be understood by one of skill in the art as being present. The base surface 230 may comprise electrical contacts 237A-D on which the corners of dome 204 may be supported. There is also the central contact 236 with which the conductive bar 206 makes contact when a user depresses the key.

In the embodiment shown, the base surface 230 also includes four pairs of LEDs, 232A and 234A, 232B and 234B, 232C and 234C, and 232D and 234D. In an embodiment discussed below, each pair may be two white light emitting diodes, with the respective white light spectra of the first and second LEDs in a pair being different. In alternative embodiments, there may be more or fewer such pairs of white light emitting diodes. In still other embodiments, the LED pairs may be replaced with sets of three colored LEDs.

Figure 2D:
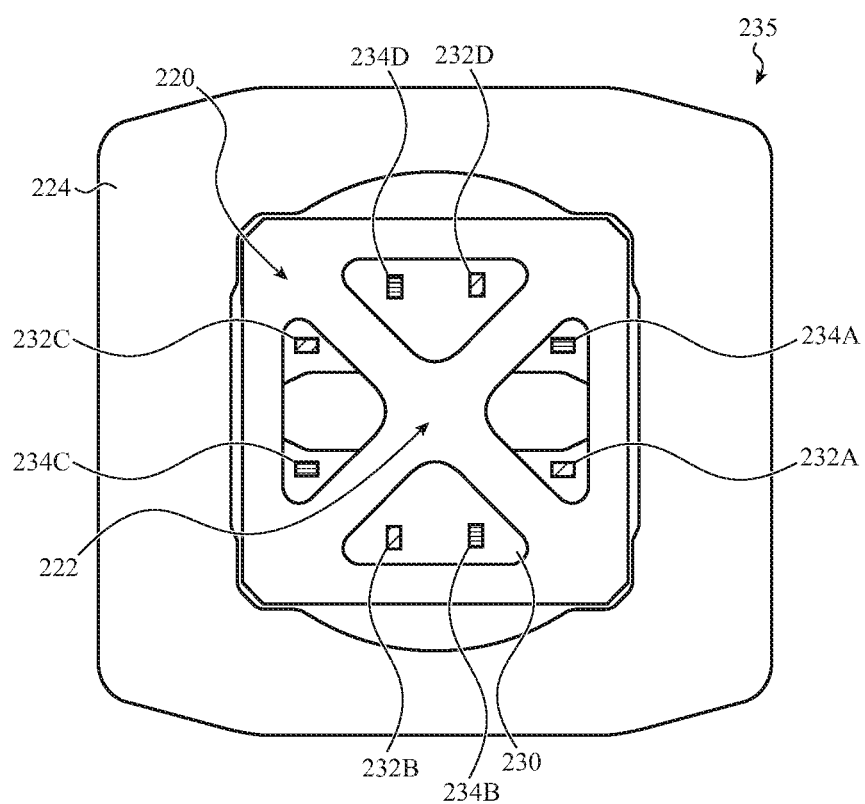
FIG. 2D illustrates a top view of the key of FIG. 2C, with light emitting diodes within the key, according to an embodiment.

FIG. 2D shows a top view of the assembled key 235 of FIG. 2C, except for the contact surface 200. The four pairs of LEDs 232A and 234A, 232B and 234B, 232C and 234C, and 232D and 234D, are configured on the base surface 230 so their respective emitted light combines before exiting through the non-opaque section of the contact surface 200. As will be further discussed below, these four pairs of LEDs can be mounted on the base surface 230 to project light directly towards the contact surface 200, or alternatively may be attached so as to project light towards one or more reflective surfaces within the assembled key 235.

Figure 2E:
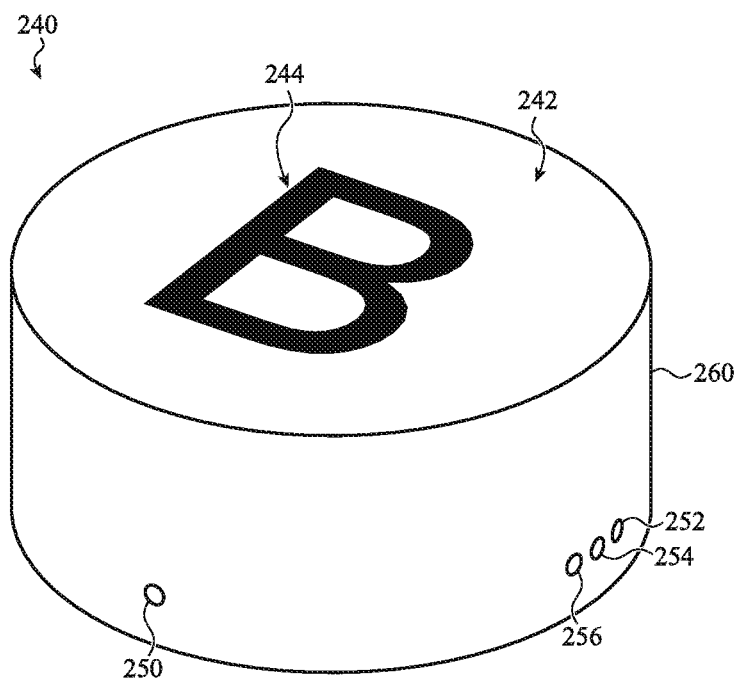
FIG. 2E illustrates a button with opaque glyph, according to an embodiment.

FIG. 2E shows an embodiment of a key 240 that may be a separate button on an instrument panel or other structure/device. Key 240 includes a contact surface 242 on which is printed a glyph 244. In this embodiment the glyph 244 is an opaque region or section, and the rest of contact surface 242 is light transmissive (e.g., is a non-opaque section). In other embodiments, the glyph 244 may be made of a light transmissive material while the rest of the contact surface 242 is an opaque region. The contact surface 242 is connected with the housing 260. The housing 260 includes connection point 250 by which user inputs are sent to the electronic device. The housing 260 also includes an input having connection points 252, 254 and 256 by which signals sent from the electronic device can be received by the key 240. The signals sent to key 240 may modify one or more operational states of LEDs contained in the key 240. For example, the input's three connection points 252, 254 and 256 may connect to respective individual colored LEDs, and the signal may cause one or more of the colored LEDs to change intensity of emitted light, or to turn 'on' or 'off' completely.

While FIGS. 2C-2E illustrate two embodiments, namely a key and a button, input devices having other electrical contact and physical configurations can use the LED lighting structures and methods described below. For example, any suitable key, switch, button, or the like may incorporate or employ embodiments as described herein. Input mechanisms with a variety of support and/or actuation mechanisms, including scissors, butterfly (e.g., V- or U-shaped) supports, domes, springs, magnets, piezoelectric materials, and the like may also incorporate illumination structures described herein. The exact structure and/or nature of any support and/or actuation mechanism, as well as any related housing or the like, may vary between embodiments.

Figure 3:
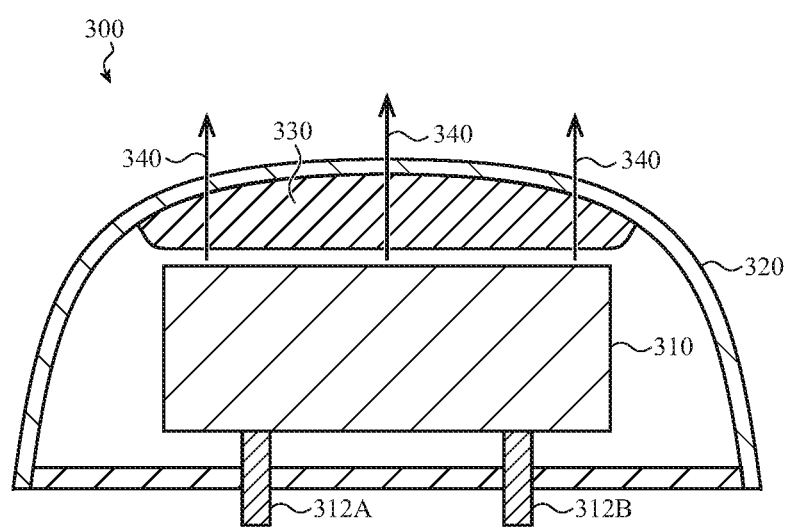
FIG. 3 illustrates a cross-sectional view of a micro light emitting diode (μLED), according to an embodiment.

FIG. 3 shows a cross-sectional view of an embodiment of an LED 300. The particular structure of LED 300 shown in FIG. 3 is for explanatory purposes, and may be varied without altering the ideas to be discussed or limiting the scope of the claims. Recall that herein 'LED' can refer to the complete electronic element, not just the semiconductor material or die that can be made to emit light. The LED 300 includes a semiconductor die 310. Electrical leads 312A-B are connected to the semiconductor die 310 allow electrical inputs (current or voltage) to be provided to the semiconductor die 310 to change an operational state of the LED. An 'operational state' any LED may refer to the intensity of light being emitted, which can be controlled by altering the amount of current flowing through the LED while the LED is in conduction mode. Also, an operational state of any LED may refer to its on/off status, with 'off' being caused by applying a reverse voltage across the leads so that the LED is in blocking mode.

The semiconductor die 310 of LED 300 is contained in a housing 320 through which the electrical leads 312A-B extend for connection to external circuitry. The housing 320 may contain a non-opaque section, such as the curved section of the housing 320, that allows light 340 emitted from the semiconductor die 310 to emerge. The non-opaque section of the housing 320 may include a phosphor layer 330, which may function to alter the spectrum of the emitted light 340, as explained below. In some embodiments, the thickness of the phosphor layer 330 can range from 5 micrometers (μm) to 100 μm. Further, in some embodiments the phosphor layer 330 may be incorporated into another non-opaque section, such as a portion of an input surface to be illuminated, a sheet or structure between the LED and the input surface, and so on.

Optically and visually, an LED is characterized by its emitted light spectrum, which is defined as the range of wavelengths of the emitted light and their corresponding intensities. The spectrum is shown by use of a spectral curve, which plots a measure of intensity (usually power or relative power) of the emitted light versus wavelength. One form of a spectral curve plots absolute power versus wavelength. Alternatively, relative power can be plotted versus wavelength, in which relative power is the ratio of power of received light at a given wavelength to the peak power detected over a range of wavelengths. Herein, "intensity" refers to either the absolute power or the relative power received at a given wavelength, or over an interval of wavelengths.

As used herein, a colored LED will refer to an LED that emits light whose spectral curve has a narrow bandwidth (as may be defined by the full width at half maximum (FWHM) of the spectral curve) on the order of a few tens of nanometers. For example, colored LEDs producing blue, yellow-green and high intensity red each have respective spectral curves with FWHM of 20-30 nanometers (nm). Various technologies exist to make colored LEDs.

Figure 4A:
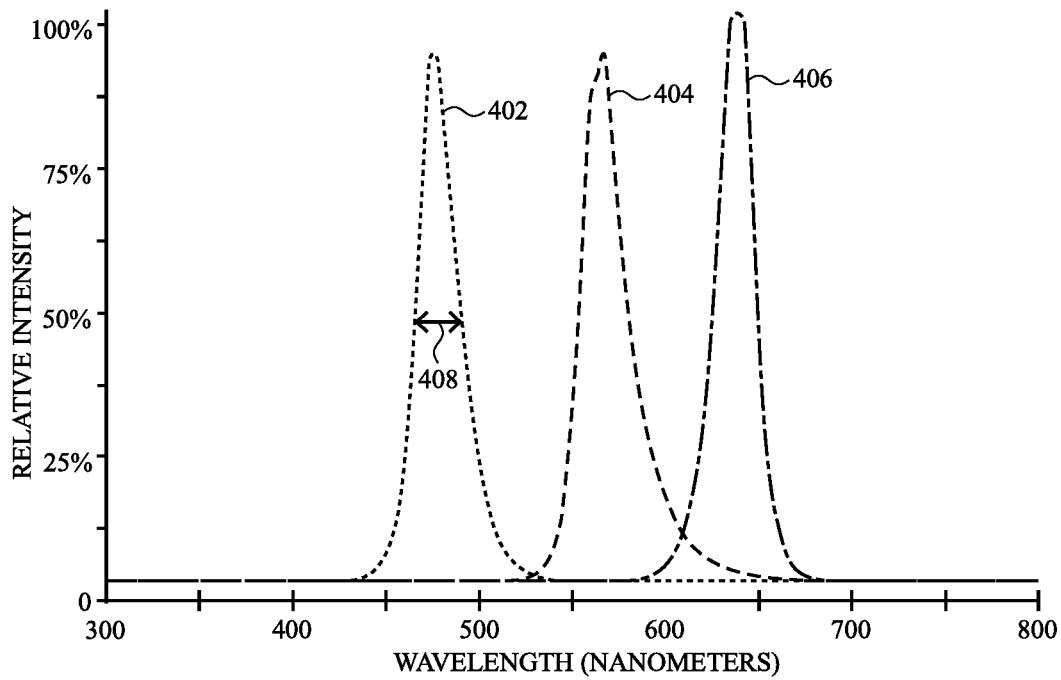
FIG. 4A illustrates three graphs, each a spectrum of light from a colored LED, according to an embodiment.

FIG. 4A shows three example spectral curves for colored LEDs plotted against the same wavelength axis. Spectral curve 402 is for a colored LED producing light that is perceived by users as blue. The spectral curve 402 has a maximum at approximately 480 nm, with a FWHM 408 of approximately 30 nanometers. Spectral curve 404 is a colored LED whose light is perceived as yellow-green; it has a maximum at approximately 560 nm. Spectral curve 406 is a colored LED whose light is perceived as red; it has a maximum at approximately 650 nm.

In some embodiments, a key may use for internal illumination a set of three colored LEDs, with each LED able to have a respective operational state, such as intensity of emitted light, separately controlled. One such set of three colored LEDs includes a red light, a green light and a blue light (RGB) emitting LEDs. Since the intensities, or even presence, of the emitted light can be separately varied, and since RGB form a triple of primary colors, it is possible to adjust the combined light to have any desired user-perceived net color (e.g., purple can be formed as combination of just red light and blue light emissions). Another triple of primary colors is based on cyan, yellow, and magenta (CYM). A triple of colored LEDs respectively producing these colors may be used in some embodiments.

As used herein, a white light LED will refer to an LED whose spectral curve covers a relatively wide portion of the visible spectrum compared to a colored LED. A first process of making a white light LED is to combine individual colored LEDs, such as RGB or CYM LEDs, into a single device so that all colors are emitted and combined to produce an emitted net light having a white light spectrum. Such a single device may only have two electrical connections: one connection to the anodes of all three colored LEDs, and one connection to all cathodes. Such a single device will be considered a single white light LED for purposes of this disclosure.

Another process for making a white light LED uses a single colored LED that is packaged so that some or all its emitted light travels through a phosphor that shifts the wavelength of transmitted light. One such example uses a blue colored LED and a YAG (yttrium-aluminum-garnet) phosphor to produce net white light. Some of the blue light of the blue colored LED undergoes a Stokes shift to become yellow-green. Other wavelengths are also produced.

Figure 4B:
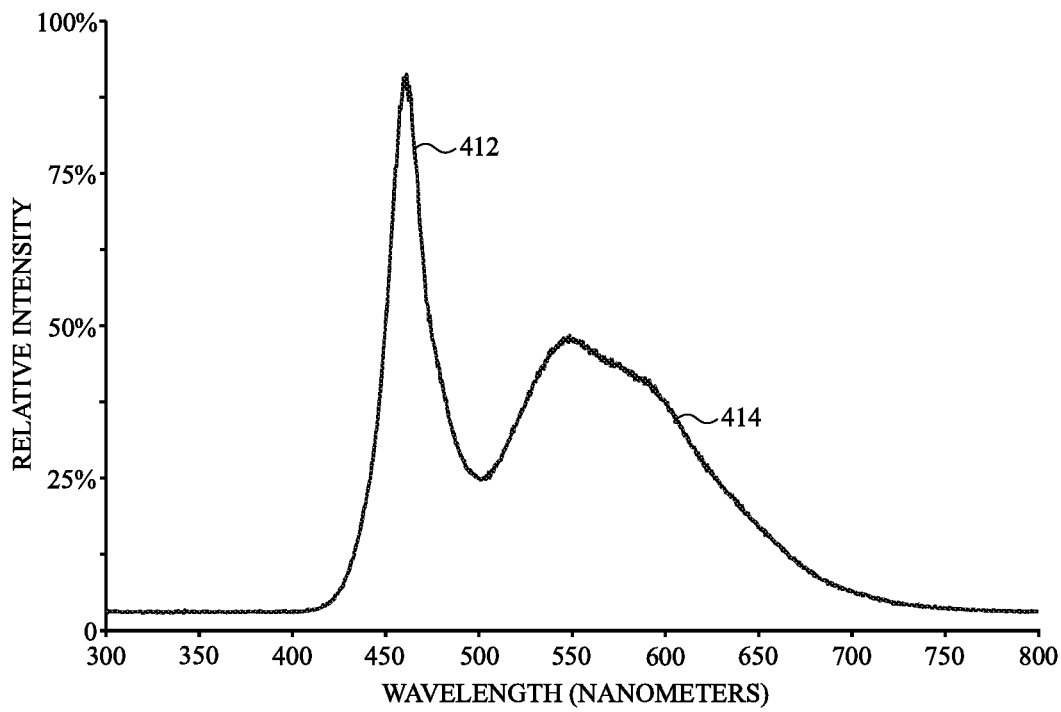
FIG. 4B illustrates a graph of a white light spectrum emitted from a white light LED, according to an embodiment.

FIG. 4B shows a white light spectrum of a white light LED based on a single blue light LED with a YAG phosphor. There is a spectral maximum 412 at approximately 470 nm corresponding to the die's emitted blue light, and a wider range of wavelengths 414 present from 500 nm to 700 nm. As used herein, a white light spectrum will denote light having a spectral curve in which the relative intensity (i.e., relative to the intensity at the wavelength having maximum intensity) is at least 25% over a wavelength interval of width at least 150 nm in the visible light spectrum of 400 to 700 nm. A 'white light LED' denotes an LED producing light with a white light spectrum.

A tone perceived by a human of the white light spectrum emitted by a white light LED can be implemented during manufacture. White light having a more pronounced yellow component (i.e., a stronger intensity at a yellow wavelength) is perceived as having a 'warmer' tone, whereas white light with more a pronounced blue component is perceived as having a 'cooler' tone. For the spectral curve shown in FIG. 4B, making the tone warmer (e.g., by using a thicker YAG phosphor coating) would shift the location of the local maximum of the curve section of wavelengths 414 to the right. In the example of a white light LED produced by a blue colored LED with a YAG phosphor coating, using a thinner phosphor coating produces a white light LED with a bluer or cooler appearance, whereas using a thicker phosphor coating produces one with a yellower or warmer appearance. In two specific embodiments, the former uses a phosphor coating thickness of 20 µm, and the latter uses a phosphor coating thickness of 40 µm.

It should be noted that a white light LED made using three individual RGB LEDs may also use phosphor coatings on any of the component colored LEDs to achieve a desired tone or net color.

Some embodiments may use a colored enclosure for an LED, rather than a phosphor-coated enclosure. For example, the material forming the enclosure may have a color, tone, hue or the like, such that white light passing through the enclosure is color-shifted, tone-shifted, and so on. Some embodiments may incorporate a phosphor into the material of the LED enclosure, rather than coating the enclosure with a phosphor. Accordingly, it should be understood that various embodiments may omit a phosphor coating and instead tone-shift light emitted from an LED by passing that light through an enclosure formed of a material (or coated with an ink, film, or the like) configured to shift the light even in the absence of a phosphor.

An LED, either a colored LED or a white light LED, can be produced at very small sizes, especially for attachment to surfaces such as printed circuit boards. Small LEDs having sizes on the order of about 10 millimeters or less are referred to herein as "micro LEDs" (µLEDs). Using µLEDs to implement internal illumination of keys has a several advantages over alternative methods of internal illumination. First, power consumption can be reduced. Second, using smaller form factor µLEDs allows for more compact and ergonomic keys. Third, µLEDs may be configured for automated surface mount insertion on printed circuit boards or housings on keys during manufacture. Fourth, multiple µLEDs may be used within a key to provide uniform internal illumination and to allow for mounting configurations that provide enhanced mixing of light emitted by the µLEDs. Fifth, µLEDs with different properties may be combined within a single key housing to allow for dynamic variation of the internal illumination of the key.

Returning to embodiments shown in FIGS. 2C-D, the two LEDs within each pair, e.g., LED pair 232A and 234A, may be μLEDs. All the embodiments described hereinafter will refer μLEDs, but standard sized LEDs may be used as space permits within the key.

The white light emitted by μLED 232A may produce a moderately 'cool' white tone, whereas its paired LED 234A may produce a white light with a warmer tone. Alternatively, both μLEDs 232A and μLED 234A may produce white light with a warner tone, but μLEDs 232C and μLED 234C may both produce white light with a cooler tone. Other embodiments may use fewer pairs, or even one pair, of μLEDs having differing white light tones. The selection of numbers of pairs of μLEDs, their locations on the base surface 230 and their respective white light tones may be based on the glyph of the key, on the area of the light transmissive area of the key's contact surface, and other criteria.

The use of pairs (or more) of white light μLEDs in which there are different tones allows for dynamic control and alteration of the tone of a key's white light internal illumination. For example, the cooler tone μLEDs may have a first common circuit connection, and the warner tone μLEDs may be on second, distinct common circuit connection so that varying a voltage on the first circuit connection increases (or decreases) the intensity of the cooler tone μLEDs' emitted white light in comparison to the warmer tone μLEDs' emitted white light. The overall tone of the white light emerging from the key's contact surface thus may be changed. The electronic device can detect a need to alter a tone of the emerging white light and alter the operational states of the μLEDs by controlling functioning of the μLEDs. This will be explained in greater detail below with respect to FIGS. 6-8.

In further embodiments, in addition to or instead of one or more pairs of white light μLEDs, colored μLEDs may be used. For example, on the base surface 230 at which the pairs of μLEDs 232A/234A through 232D/234D are located, those pairs of white light μLEDs may be replaced with triples of RGB colored μLEDs. Each color of the colored μLEDs in the triples may also be separately controlled to produce different intensities of emitted light, and so change a net color of the internal illumination of a key.

Depending on the size of the key, the number and locations of μLEDs used for internal illumination, and the material used for the light transmissive area of the key's contact surface, it may be advantageous to configure the μLEDs so that their emitted light is not directly projected at the contact surface. For example, if the material used for the light transmissive area is a clear plastic or glass, and the white light μLED pair 232A and 234A cannot be located close enough together, the internal illumination they provide may appear to a user as separate points. Embodiments are described below in relation to FIGS. 5A-D that can provide for mixing of the light emitted by the μLEDs to produce a uniform net light emerging through the contact surface as a whole. In the embodiments of FIGS. 5A-D, a pair of white light μLEDs 510 and 512 is shown. As noted above, in additional or alternative embodiments the μLEDs may be a set of colored μLEDs, such as those described above.

FIGS. 5A-D show block diagrams of side views into an internal volume of a key. The configurations shown are for explanatory purposes, and may be varied without altering the ideas to be discussed or limiting the scope of the claims. In particular, for simplicity of explanation internal components of a key, such as those shown in FIG. 2C, are not shown.

In the embodiments of FIGS. 5A-D, a light transmissive area 500, such as on contact surface 200, 210 or 242, is opposite to an internal surface 530 of the key. For example, the internal surface 530 may be the base surface 230 of FIG. 2C, or it may be another internal structure within the key as a whole. In the embodiments of FIGS. 5A-D, a pair of white light μLEDs 510 and 512 is shown. As noted above, in additional or alternative embodiments the μLEDs may be a set of colored μLEDs, such as those described above.

Figure 5A:
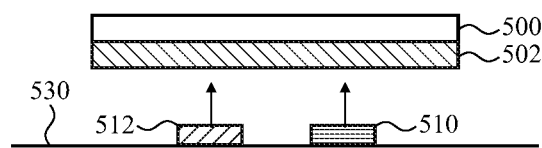
FIG. 5A illustrates a configuration of μLEDs and a keycap with a light diffusor, according to an embodiment.

FIG. 5A illustrates a first family of embodiments in which the μLEDs 510 and 512 are mounted on the internal surface 530 and their emitted light is projected directly towards the light transmissive area 500 input surface. In this embodiment, input surface also includes a light diffusor 502, such as a translucent material. In one embodiment, the light diffusor 502 may simply be a translucent material used for the light transmissive area 500 of the input surface. In other embodiments, the light diffusor 502 may be an additional material on the underside of the contact surface that faces into the key housing, such as the optional film member 203.

Figure 5B:
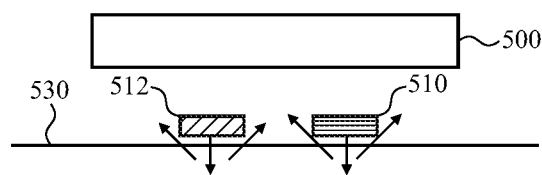
FIG. 5B illustrates a configuration of μLEDs and a reflective surface, according to an embodiment.

FIG. 5B illustrates a second family of embodiments in which the μLEDs are mounted above but proximate to the internal surface 530. The μLEDs 510 and 512 are oriented so that their light is projected away from the key's input surface 500 towards the internal surface 530. The internal surface 530 may be made with a topical reflective coating, at least beneath the μLEDs. The light emitted by the μLEDs 510 and 512 reflects from the reflective coating. This can produce spreading and mixing to combine the separate lights emitted by each of the μLEDs 510 and 512. The combined light then emerges with a uniform appearance through the input surface 500.

Figure 5C:
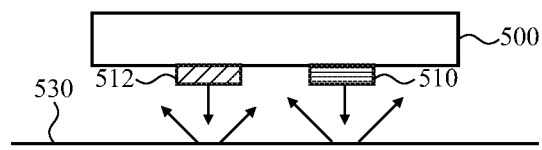
FIG. 5C illustrates an alternate configuration of μLEDS and a reflective surface, according to an embodiment.

FIG. 5C illustrates a third family of embodiments in which the μLEDs are mounted on the interior side of the input surface 500 and projected away from the input surface 500 towards the internal surface 530. The internal surface 530 of these embodiments also includes a reflective coating, at least beneath the μLEDs 510 and 512. As just described, this can produce spreading and mixing of the separate light from the μLEDs 510 and 512 to combine their separately emitted light. The combined light then emerges with a uniform appearance through the input surface 500.

Figure 5D:
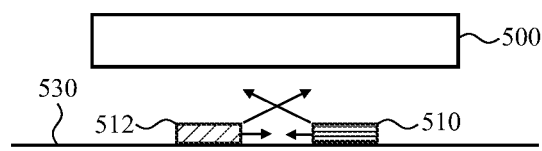
FIG. 5D illustrates a configuration of side firing μLEDs affixed to a reflective surface, according to an embodiment.

FIG. 5D illustrates a fourth family of embodiments in which the μLEDs 510 and 512 are mounted to the internal surface 530 but are oriented to be side firing, i.e., their light is emitted parallel to the internal surface 530 and the input surface 500. The internal reflections within the key of the side fired light produces a desired spreading and mixing of the μLEDs' emitted light. A combined light emerging through the input surface 500 may thus have a uniform appearance.

Figure 5E:
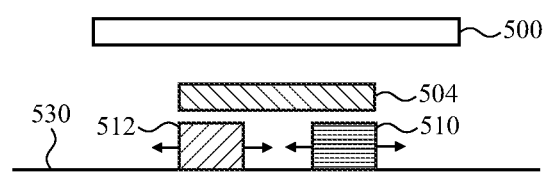
FIG. 5E illustrates a configuration of side firing μLEDs affixed below a reflective surface, according to an embodiment.

FIG. 5E illustrates a fifth family of embodiments in which the μLEDs are mounted to the internal surface 530 opposite the input surface 500, but are oriented to be side firing; i.e., their lights are emitted parallel to the internal surface 530 and the input surface 500. The first side firing μLED 510 is a yellow biased μLED, and can be a bare die. The second side firing μLED 512 is a blue biased μLED, and can be a bare die. The internal reflections within the key of the side fired light from the μLEDs 510 and 512 produce a desired spreading and mixing of the μLEDs' emitted light. Such combination of light can be enhanced or facilitated by the reflector 504. Particular embodiments of reflector 504 include mechanically doped, encapsulate doped, or spray coated reflectors. A combined light emerging through the input surface 500 may thus have a uniform appearance.

In additional and/or alternative embodiments, the white light μLEDs 510 and 512 may be replaced or supplemented by colored μLEDs. There may be multiple pairs, or other combinations, of white light and/or colored μLEDs.

Electronic devices using keys according to the embodiments just described may implement methods of dynamically varying internal illumination from such keys. Applying such methods can improve a user's experience with the device, or the methods can be used to provide information to the user.

A first application of the methods relates to sensing the tone or color of the ambient light (or other suitable property) in the environment of the electronic device, and adjusting the internal illumination of the keys to match more closely the tone or color of the ambient light of the environment of the electronic device. In a second application, the tone or color of the internal illumination may be deliberately altered from the ambient light of the environment of the electronic device to provide greater visibility of the keys of a keyboard. In a third application, a program running on the processor may return instructions to the processor to alter the appearance of the keyboard and so provide information to a user. For example, an industrial control program may send instructions for the processor to internally illuminate a key of a keyboard in red if a potentially dangerous situation develops.

Figure 6:
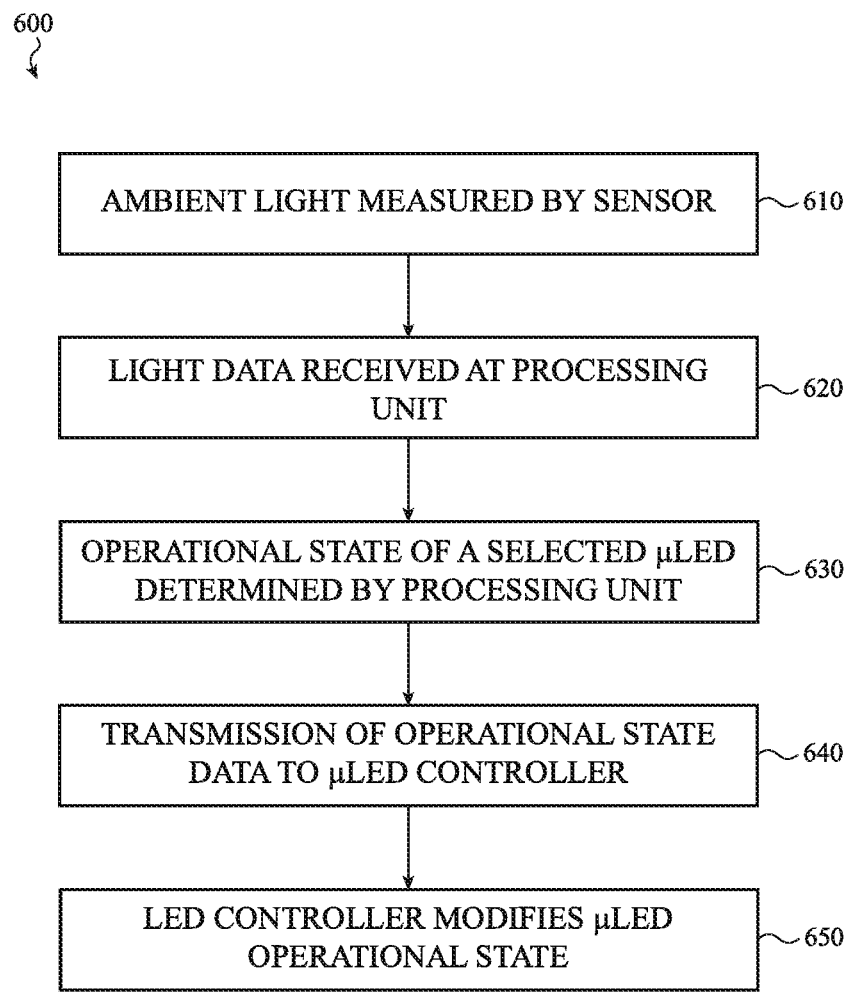
FIG. 6 is a flow chart of a sample method of controlling internal illumination of a keyboard using keys with LEDs, according to an embodiment.

FIG. 6 shows a flow chart of a method 600 of controlling internal illumination of keys by changing operational states of μLEDs within the keys, such as keys according to the embodiments just described. The process begins at stage 610 with detection and measurement of one or more properties of the ambient light in an environment of the electronic device, such as by a dedicated light sensor or camera 134 (and associated processing unit), as shown in FIGS. 1A-B. The measurement may be of any suitable property, including the spectrum of the light, its brightness, its tone, its color, its relative warmth and/or coolness, and so on. The measurement may then be converted to a data format that can be recognized and used by a processor or logic unit. One example of such a data format is a table of spectrum intensity values and wavelengths. An alternative data format may be a single numerical value related to brightness of the ambient light, or any other property of the ambient light. In stage 620, this data is received at a processing unit or logic unit for analysis.

The method 600 continues in stage 630 with the processing unit making a determination of how to vary, if at all, the operational state of selected μLEDs within the keys. This determination may include the relative intensities of light to be emitted by the μLEDs, or whether to turn 'on' or 'off' any of the μLEDs.

At stage 640, the processor transmits data to a μLED controller in a form to be used by the μLED controller to implement the variation in internal illumination. For example, the data may include data related to relative weights of light intensity to be emitted by the pair or pairs of white light μLEDs described in the embodiments above.

At stage 650 of the method, a μLED controller modifies the operational state of an μLED or set of μLEDs. As described in more detail herein, the modification may be implemented either through use of pulse width modulation, or use of direct voltage or current input control. Other methods of modification may also be used.

Figure 7:
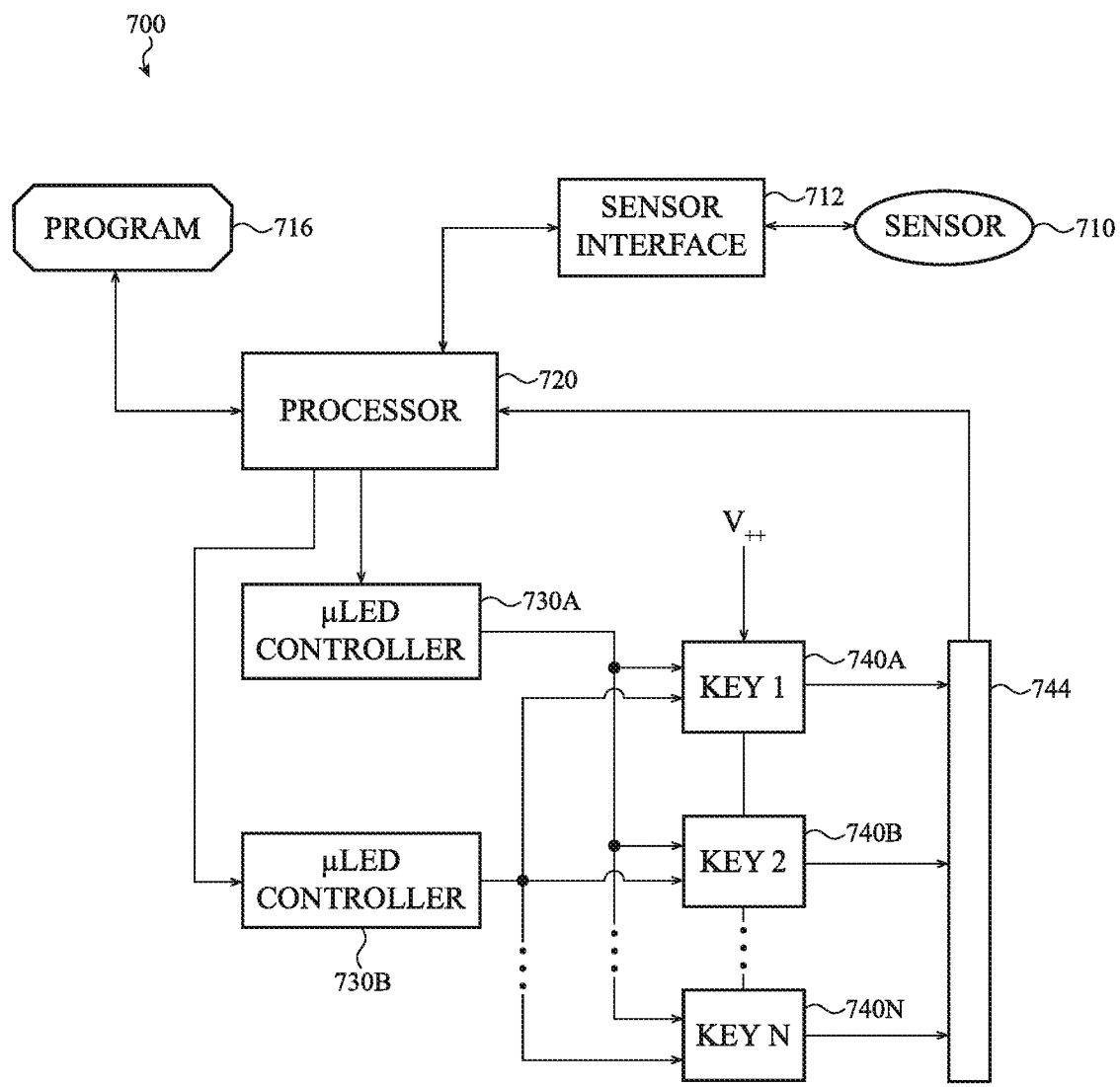
FIG. 7 shows a block diagram of a sample circuit for controlling internal illumination of a keyboard having keys with LEDs, according to an embodiment.

FIG. 7 illustrates a block diagram of a system for dynamic and individual control of internal illumination in keys of an electronic device. It can be used to implement the example method 600 described in FIG. 6. The keys 740A, 740B through 740N may be any of the embodiments of keys with μLED internal illumination control discussed above. For the embodiment shown in FIG. 7 the keys are shown with two inputs, as would be the case when the keys each have one or more pairs of white light μLEDs having different tones, as in embodiments described above. However, it is clear that the system is readily adapted to use keys having three inputs and using colored μLEDs, as previously described.

The system includes a processor 720, examples of which include a general-purpose microprocessor, an application specific integrated circuit (ASIC), a field programmable gate array (FPGA), or a microcontroller. The keys are communicatively linked with the processor 720. In the embodiment shown this link includes a bus 744 through which the processor 720 receives signals about which keys have been pushed.

The processor 720 is communicatively linked with a sensor interface 712. The sensor interface 712 is linked with a sensor 710. In some embodiments, the sensor 710 may be a dedicated light sensor or a camera containing an array of pixels that obtain light or visual data of a user environment. The sensor interface 712 may be operable to apply preliminary processing, such as determination of ambient light brightness or spectral analysis, and to communicate the results to the processor 720. The processor 720 may transmit signals to the sensor interface 712 to alter the sensor's performance, such as to have the sensor enter a sleep mode to conserve power.

In some embodiments, the processor 720 may run a program 716. The program 716 can send instructions to the processor 720 to cause the processor 720 to alter the internal illumination of certain keys. The processor 720 is communicatively linked with at least one μLED controller. The embodiment shown includes two μLED controllers 730A and 730B. This embodiment may be used with keys that have a pair or pairs of white light LEDs that emit at different tones, as described above. The μLED controller 730A may control a bluer/cooler μLEDs within all the keys, whereas μLED controller 730B may control the yellower/warmer μLEDs within all the keys. This embodiment allows just two μLED controllers 730A and 730B to be used to adjust internal illumination of all the keys of a keyboard. As noted, embodiments can use keys with sets of colored μLEDs, in which case a third μLED controller (not shown) may be added.

Figure 8:
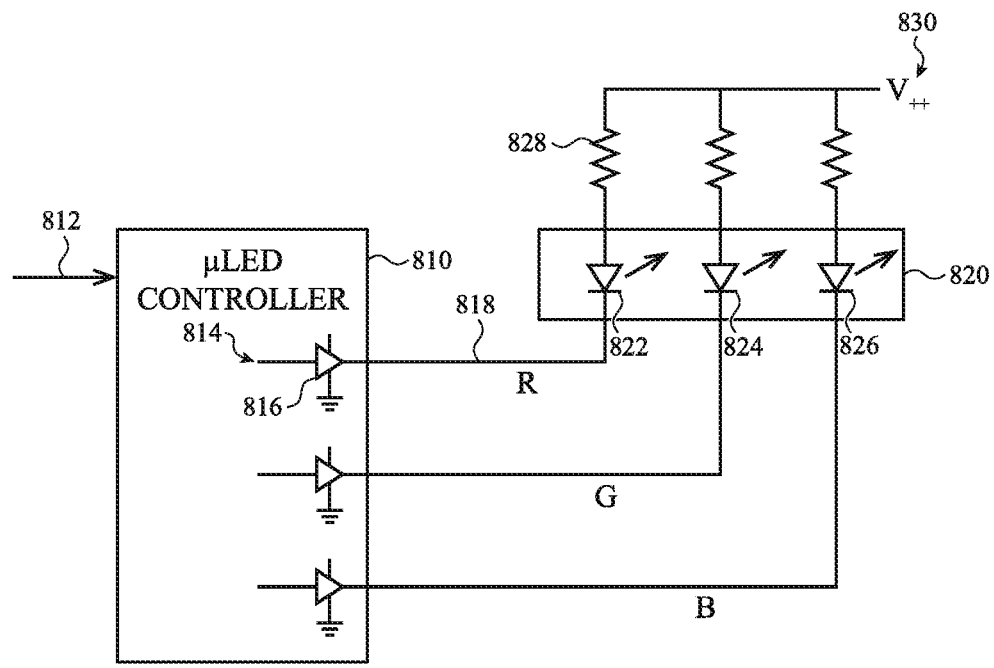
FIG. 8 illustrates a sample circuit diagram for voltage control of lighting from an LED, according to an embodiment.

FIG. 8 illustrates a first block diagram for a circuit for voltage or current control of light emitted by at least one μLED, according to various embodiments. In the example shown, the μLEDs 820 is made with three colored μLEDs, 822, 824 and 826, which in this example are RGB, respectively. However, it is clear that the circuit shown in FIG. 8 may easily be adapted for control of white light μLEDs. The μLED controller 810 is configured to receive an input signal 812, such as from the processor previously discussed, to alter an operational state of the μLED 820. The input signal 812 may be a digital numerical value, a three-vector of digital numerical values, or another signal. The μLED controller 810 uses the input signal 812 to determine an internal input value 814 to use to drive one or more buffer amplifiers 816. In the circuit shown an individual buffer amplifier 816 is used to drive each of the component colored μLEDs 822, 824 and 826. The buffer amplifier 816, in conjunction with supply voltage $V_{++}$ (830) and pullup resistor 828, may vary an analog output 818 over a continuous range of values and so vary the intensity of light emitted by the red diode 822 over a respective continuous range of values. For one particular colored μLED, this can appear to a user as dimming or brightening. By varying the relative intensities of light emitted by the three colored μLEDs 822, 824 and 826, the output tone or color of the net light emitted by μLED 820 can be varied.

Figure 9:
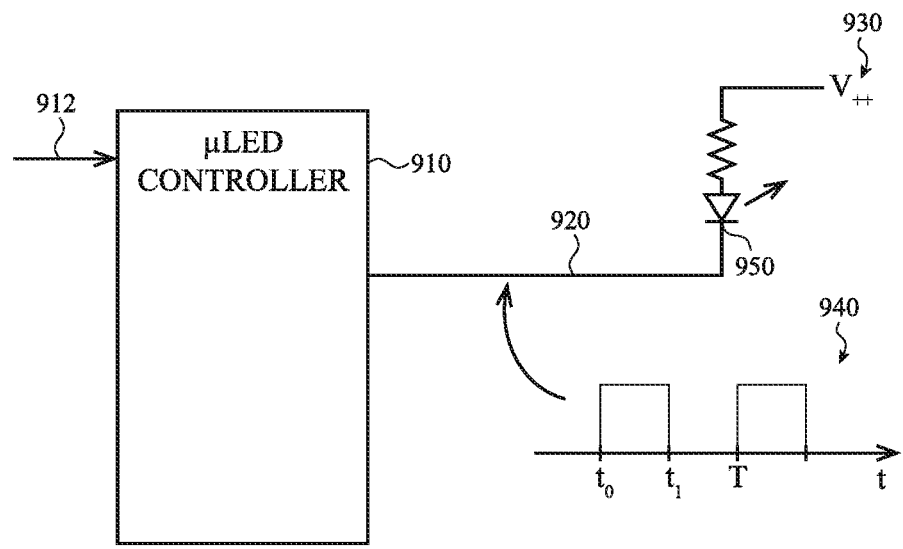
FIG. 9 illustrates a sample circuit diagram for control of lighting from an LED using pulses width modulation, according to an embodiment.

FIG. 9 illustrates another process for control of light emitted by at least one μLED in various embodiments. This process can be used with either a white light μLED or a colored μLED. The process uses pulse width modulation (PWM) of a signal (e.g., voltage or current) to sequentially turn the μLED 950 'on' (e.g., by a voltage going low, or near zero) and 'off' (e.g., by a voltage going high, or near the supply voltage $V_{++}$ (930) during a time period T, shown as $t_0$ to T in the graph. The signal over $t_0$ to T is thereafter repeated. If the period T is small enough (e.g., $T-t_0=0.001$ sec), a user-perceived output intensity of the light from μLED 950 can appear constant, even if during any 'on' time the μLED emits light at a single intensity. By varying the duty cycle (e.g., the percent of time in a period that the μLED is 'on' and emitting light), the constant appearing intensity of the light can be varied. When μLED controller 910 controls a first white light μLED that produces light having a first white light spectrum, and a second such μLED controller (not shown) controls a second white light μLED that produces light having a second white light spectrum different from the first white light spectrum, the spectrum of a net light formed by combining both white lights can be varied over a continuous range of tones.

The μLED controller 910 receives an input signal 912, such as from a processor or logic unit, to implement or alter an operational state of the μLED 950, such as 'on'/'off' status or desired output intensity. The input signal 912 may explicitly provide the duty cycle value, or may be interpreted by the μLED controller 910 to determine the duty cycle. The μLED controller 910 then provides the PWM output signal 940 on output channel 920 to the μLED 950. For the output signal 940 shown, since the μLED 950 is 'on' from time $t_1$ to the end of the period T, the duty cycle is seen to be $(T-t_1)/T$. In an alternative configuration (not shown) in which the output signal 940 of the μLED's controller 910 directly drives the μLED 950, the μLED 950 is 'on' during time $t_0$ to $t_1$, so that the duty cycle would be $(t_1-t_0)/T$.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
   an ambient light sensor; and
   an input device comprising:
      a contact surface having a light transmissive area;
      a first light emitting diode (LED) operative to emit a first light having a first white light spectrum; and
      a second LED operative to emit a second light having a second white light spectrum that is different from the first white light spectrum;
   wherein:
   the first and the second LEDs are positioned beneath the contact surface so that the first light and the second light combine to form a combined light having a combined white light spectrum;
   the combined light is visible through the light transmissive area of the contact surface; and
   at least one of the first LED or the second LED is operable to switch from a first operational state to a second operational state in response to a signal received from the electronic device during operation of the electronic device.

2. The electronic device of claim 1, wherein the first light has a cooler tone than the second light.

3. The electronic device of claim 1, wherein:
   the first LED comprises a first phosphor coating having a first thickness through which the first light emerges;
   the second LED comprises a second phosphor coating having a second thickness through which the second light emerges; and
   the second thickness is different from the first thickness.

4. The electronic device of claim 3, wherein the first and second phosphor coatings are yttrium-aluminum-garnet phosphors.

5. The electronic device of claim 3, wherein:
   the first phosphor coating defines a portion of a first housing for the first LED; and
   the second phosphor coating defines a portion of a second housing for the second LED.

6. The electronic device of claim 3, wherein:
   the first thickness is about 20 microns; and the second thickness is about 40 microns.

7. The electronic device of claim 1, wherein:
   the first LED and the second LED are positioned on a base surface opposite the contact surface; and
   the first LED and the second LED emit the first light and the second light towards the contact surface.

8. The electronic device of claim 7, wherein the input device further comprises a light diffusor disposed between the base surface and the contact surface.

9. The electronic device of claim 1, wherein the first LED and the second LED are positioned between the contact surface and a reflective surface that is opposite to the contact surface, so that the first light and the second light are projected towards the reflective surface.

10. The electronic device of claim 1, wherein the first LED and the second LED are configured on a base surface opposite the contact surface and configured so that the first light and the second light are projected parallel to the base surface.

11. An electronic device, comprising:
    a sensor configured to detect a property of an ambient light exterior to the electronic device;
    an input device comprising:
       a contact surface comprising:
          an opaque region; and
          a non-opaque section through which light can pass, the non-opaque section adjacent the opaque region;
       a base surface opposite the contact surface;
       a set of micro light emitting diodes (μLEDs), comprising: a first μLED that emits a red light;
       a second μLED that emits a blue light; and a third μLED that emits a green light; and
       a LED controller configured to receive a signal sent from the electronic device;
    wherein:
    the red, blue, and green light combine to form a transmitted light having a net color, the transmitted light visible through the non-opaque section of the contact surface; and
    the LED controller is operative to cause at least one of the set of μLEDs to vary intensity of its emitted light, thereby changing the net color.

12. The electronic device of claim 11, wherein the set of µLEDs includes a fourth µLED that emits light having a white light spectrum.

13. The electronic device of claim 11, wherein:
- the sensor is operative to detect a change in a tone of ambient light; and
- the LED controller is operative to vary the net color in response to the change in ambient light.

14. The input device of claim 11, further comprising a reflective surface configured to combine the red light, blue light, and green light into the transmitted light.

* * * * *